US012363740B2

(12) United States Patent
Fong et al.

(10) Patent No.: US 12,363,740 B2
(45) Date of Patent: Jul. 15, 2025

(54) MULTIPLEXING SCI-EXCLUSIVE MESSAGES AND DATA-EXCLUSIVE TRAFFIC ON SIDELINKS

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/462,617

(22) Filed: Aug. 31, 2021

(65) Prior Publication Data

US 2023/0066859 A1    Mar. 2, 2023

(51) Int. Cl.
| | |
|---|---|
| *H04W 72/00* | (2023.01) |
| *H04L 1/00* | (2006.01) |
| *H04L 5/00* | (2006.01) |
| *H04W 72/0446* | (2023.01) |
| *H04W 72/25* | (2023.01) |
| *H04W 72/40* | (2023.01) |
| *H04W 76/28* | (2018.01) |
| *H04W 92/18* | (2009.01) |

(52) U.S. Cl.
CPC ........... *H04W 72/40* (2023.01); *H04L 1/0061* (2013.01); *H04L 5/0051* (2013.01); *H04W 72/0446* (2013.01); *H04W 72/25* (2023.01); *H04W 76/28* (2018.02); *H04W 92/18* (2013.01)

(58) Field of Classification Search
CPC ............ H04W 72/40; H04W 72/0446; H04W 72/25; H04W 76/28; H04W 92/18; H04W 64/006; H04W 76/14; H04W 52/0229; H04L 1/0061; H04L 5/0051; H04L 1/1893; H04L 1/1896; H04L 5/0053
See application file for complete search history.

(56) References Cited

U.S. PATENT DOCUMENTS

| | | | |
|---|---|---|---|
| 2020/0220669 A1* | 7/2020 | Park ...................... | H04L 1/1896 |
| 2021/0068101 A1* | 3/2021 | Chen ..................... | H04L 1/0072 |
| 2022/0095280 A1* | 3/2022 | Farag ................... | H04W 72/121 |
| 2022/0377726 A1* | 11/2022 | Son ....................... | H04W 72/20 |

(Continued)

FOREIGN PATENT DOCUMENTS

CN                111837437 A   * 10/2020   ........... H04L 5/0005

*Primary Examiner* — Brandon M Renner
(74) *Attorney, Agent, or Firm* — Procopio, Cory, Hargreaves & Savitch LLP

(57) ABSTRACT

Aspects presented herein may enable a UE to multiplex an SCI-exclusive message with a data-exclusive message/traffic. In one aspect, a first UE multiplexes SCI with a PSSCH in a slot, the SCI being associated with a control message and the PSSCH being associated with a data message, and the SCI including an indication that the SCI and the PSSCH are decoupled in the slot. The first UE transmits, to a second UE, the SCI and the PSSCH in the slot. In another aspect, a second UE receives, from a first UE, SCI and a PSSCH in a slot, the SCI being associated with a control message and the PSSCH being associated with a data message, and the SCI including an indication that the SCI and the PSSCH are decoupled in the slot. The second UE decodes the data message based at least in part on the indication.

27 Claims, 13 Drawing Sheets

(56) References Cited

U.S. PATENT DOCUMENTS

2022/0417959 A1* 12/2022 Zhao .................... H04W 72/23
2023/0013868 A1   1/2023 Fong et al.
2023/0209412 A1* 6/2023 Liu ..................... H04W 28/26
                                                 370/329

* cited by examiner

MULTIPLEXING SCI-EXCLUSIVE MESSAGES AND DATA-EXCLUSIVE TRAFFIC ON SIDELINKS

TECHNICAL FIELD

The present disclosure relates generally to communication systems, and more particularly, to wireless communication involving sidelink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus multiplexes sidelink control information (SCI) with a physical sidelink shared channel (PSSCH) in a slot, the SCI being associated with a control message and the PSSCH being associated with a data message, and the SCI including an indication that the SCI and the PSSCH are decoupled in the slot. The apparatus transmits, to a second UE, the SCI and the PSSCH in the slot.

In an aspect of the disclosure, a method, a computer-readable medium, and an apparatus are provided at a second wireless device. The apparatus receives, from a first UE, SCI and a PSSCH in a slot, the SCI being associated with a control message and the PSSCH being associated with a data message, and the SCI including an indication that the SCI and the PSSCH are decoupled in the slot. The apparatus decodes the data message based at least in part on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
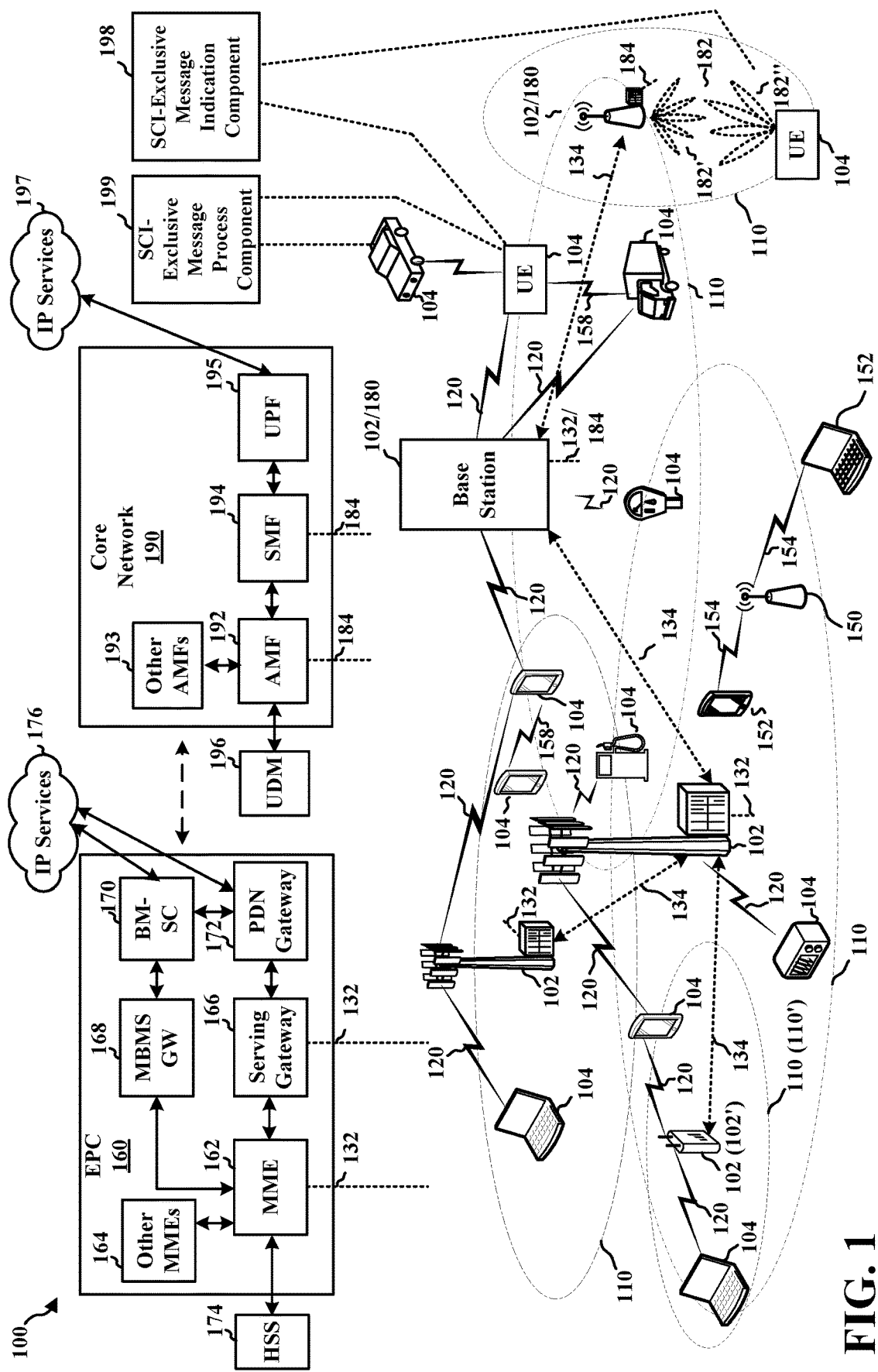
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve sidelink resource allocation and utilization for sidelink devices. Aspects presented herein may enable a transmitting sidelink device to multiplex an SCI-exclusive message with a data-exclusive message/traffic to improve resource utilization. In addition, the transmitting sidelink device may indicate to a receiving sidelink device that SCI (e.g., a PSCCH) and data (e.g., a PSSCH) in a slot are decoupled (e.g., not coupled), such that the receiving sidelink device may be aware that the SCI is not associated with data. As used herein, when SCI (e.g., a PSCCH) and data (e.g., a PSSCH) in a slot are decoupled, the SCI does not reserve resources for the PSSCH in the same slot. On the other hand, when SCI (e.g., a PSCCH) and data (e.g., a PSSCH) are coupled in a slot, the SCI reserves resources for the PSSCH in the same slot.

In certain aspects, the UE 104 may include an SCI-exclusive message indication component 198 configured to multiplex an SCI-exclusive message with a data-exclusive message/traffic and transmit an indication indicating the SCI-exclusive message is not associated with data. In one configuration, the SCI-exclusive message indication component 198 may be configured to multiplex SCI with a PSSCH in a slot, the SCI being associated with a control message and the PSSCH being associated with a data message, and the SCI including an indication that the SCI and the PSSCH are decoupled in the slot. In such configuration, the SCI-exclusive message indication component 198 may transmit, to a second UE, the SCI and the PSSCH in the slot.

In certain aspects, the UE 104 may include an SCI-exclusive message process component 199 configured to receive, from a first UE, SCI and a PSSCH in a slot, the SCI being associated with a control message and the PSSCH being associated with a data message, and the SCI including an indication that the SCI and the PSSCH are decoupled in the slot. In such configuration, the SCI-exclusive message process component 199 may decode the data message based at least in part on the indication.

In certain aspects, the UE 104 may include both the SCI-exclusive message indication component 198 and the SCI-exclusive message process component 199. As such, the UE 104 may multiplex an SCI-exclusive message with a data-exclusive message/traffic and transmit an indication indicating the SCI-exclusive message is not associated with data, and the UE 104 may also receive and process SCI and data that are not coupled in a slot.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
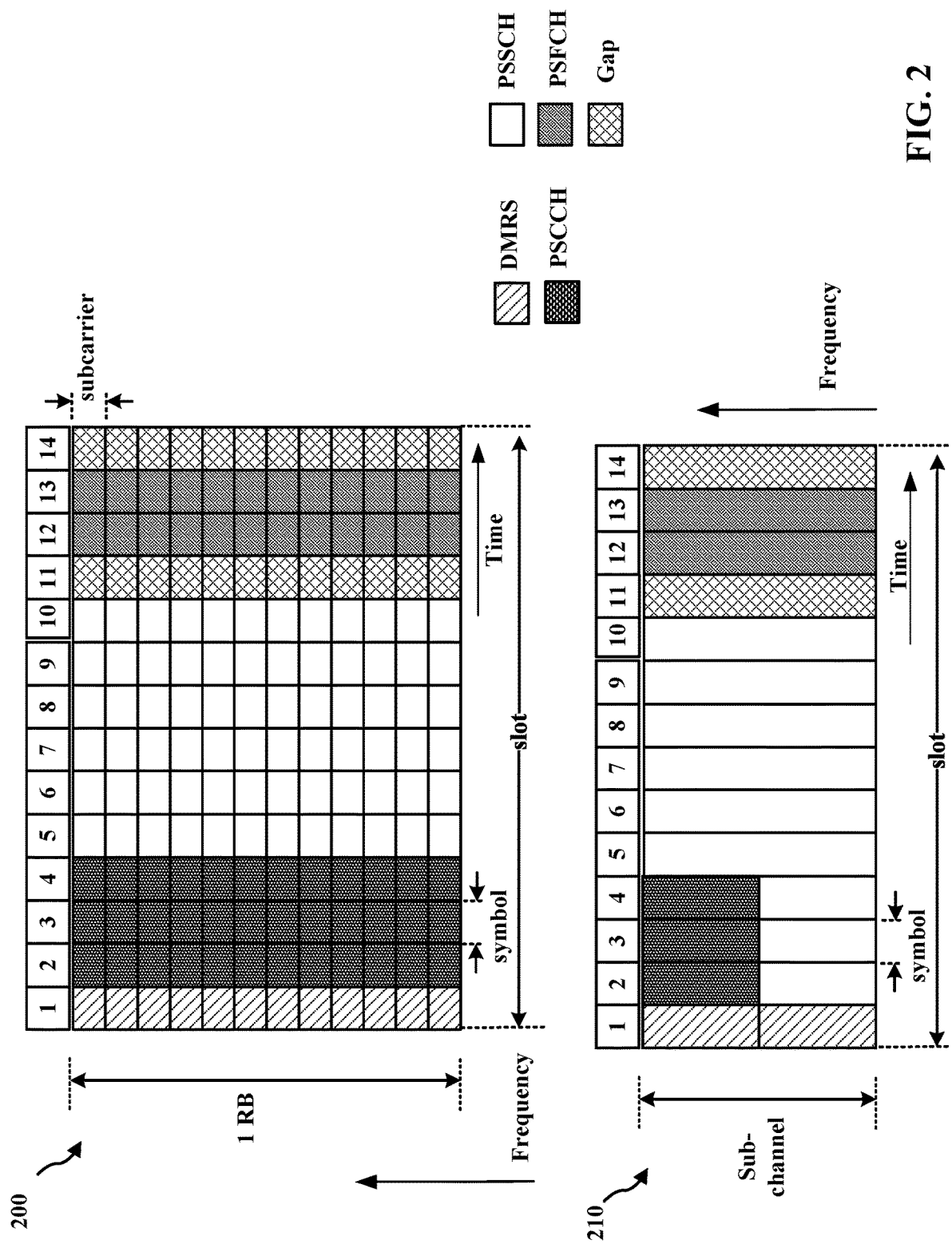
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
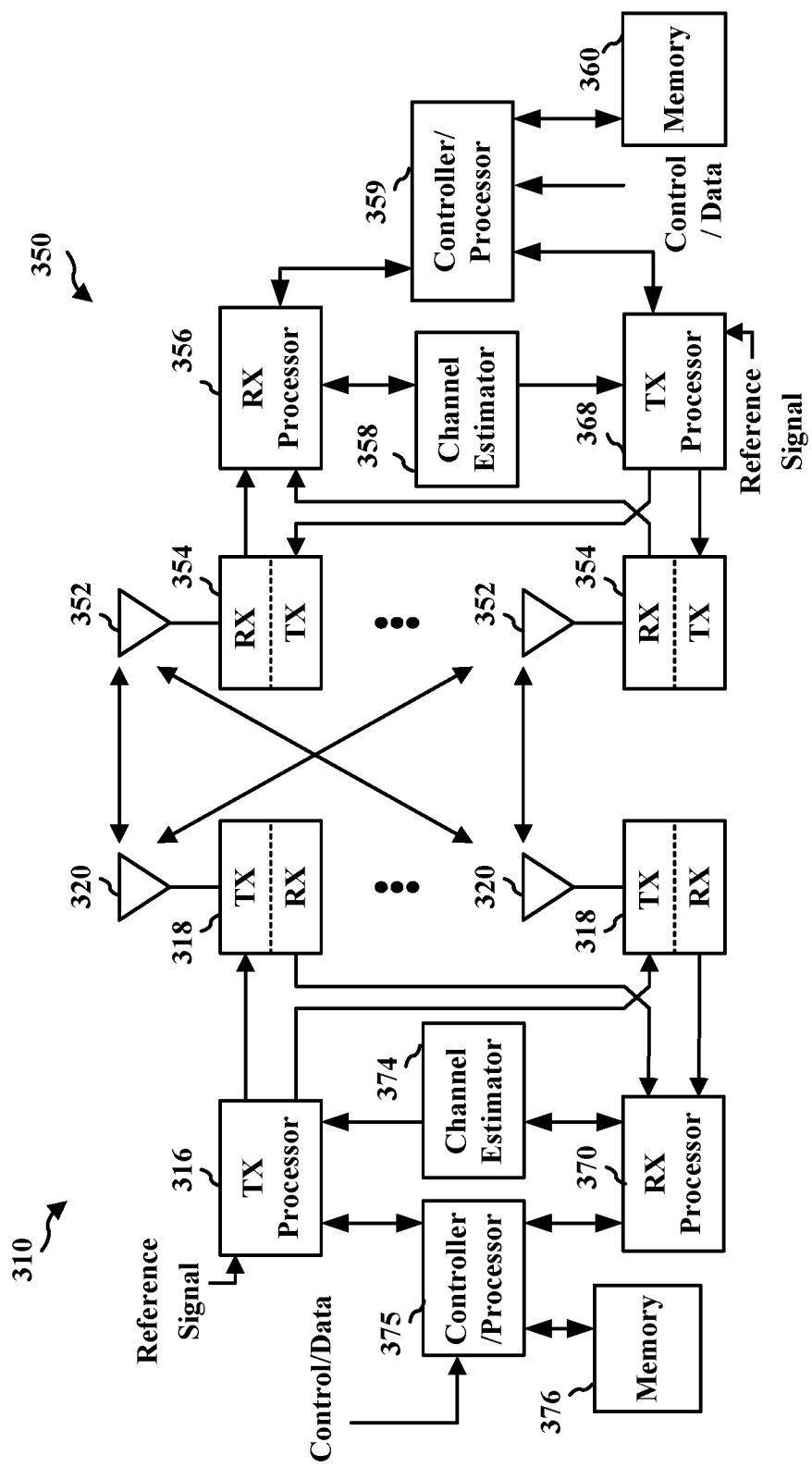
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the SCI-exclusive message indication component 198 of FIG. 1. In another example, at least one of the TX processor 368, the RX processor 356, and the controller/processor 359 may be configured to perform aspects in connection with the SCI-exclusive message process component 199 of FIG. 1. In another example, at least one of the TX processor 368, the RX processor 356, and the controller/processor 359 may be configured to perform aspects in connection with both the SCI-exclusive message indication component 198 and the SCI-exclusive message process component 199 of FIG. 1.

Figure 4:
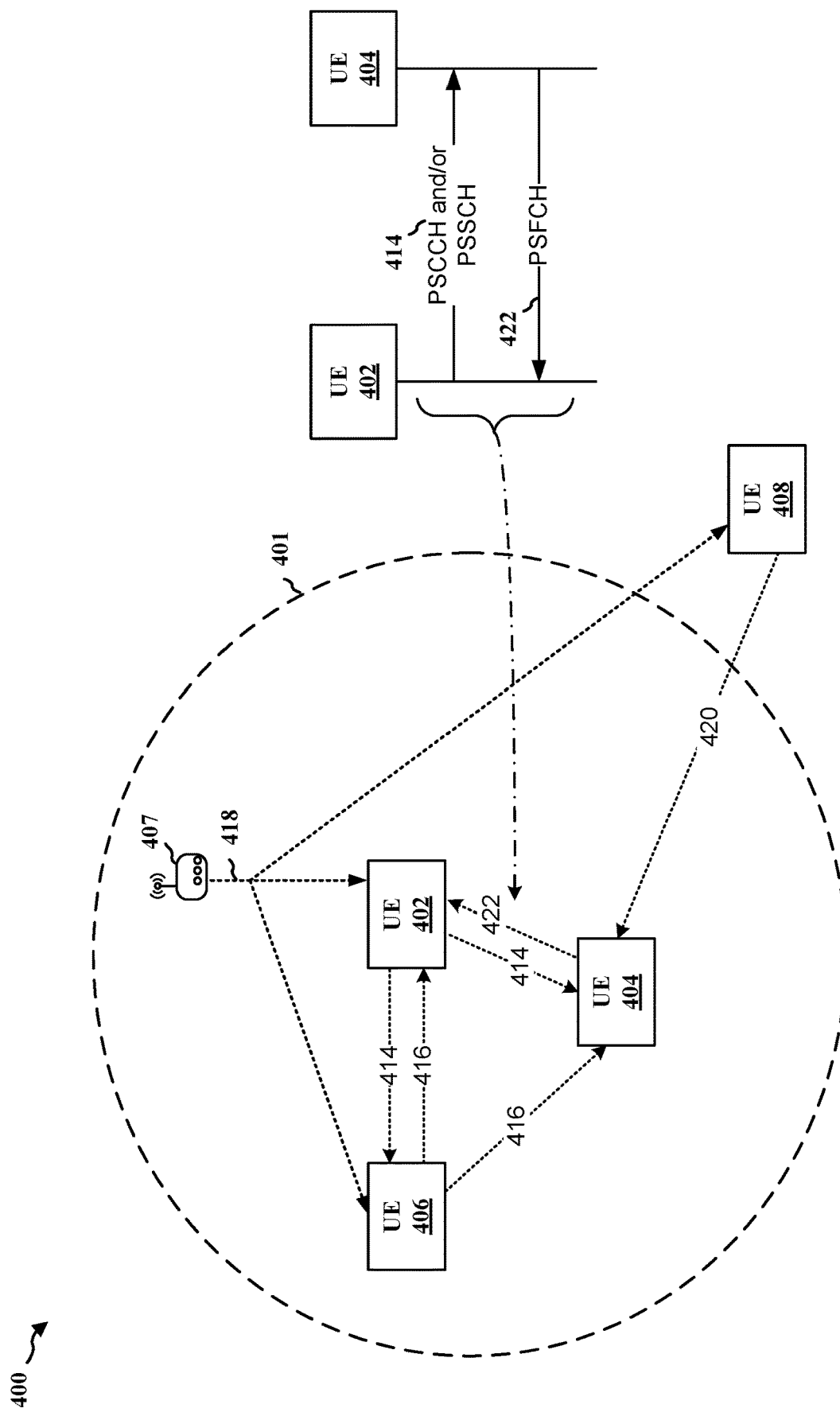
FIG. 4 is a diagram illustrating an example of wireless communication between devices based on sidelink communication in accordance with various aspects of the present disclosure.

FIG. 4 is a diagram 400 illustrating an example of wireless communication between devices based on sidelink communication in accordance with various aspects of the present disclosure. In one example, a UE 402 may transmit a transmission 414, e.g., including a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between sidelink UEs may include discovery messages for sidelink UEs to find nearby UEs and/or may include sensing of resource reservations by other sidelink UEs in order for sidelink UEs to select resources for transmission. Sidelink communication may be based on different types or modes of resource allocation mechanisms. In a first resource allocation mode (which may be referred to as "Mode 1," "sidelink transmission Mode 1," and/or "V2X Mode 1," etc.), a centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180, such as via a resource radio control (RRC) message or a downlink control information (DCI) message (e.g., DCI 3_0).

In a second resource allocation mode (which may be referred to as "Mode 2," "sidelink transmission Mode 2," and/or "V2X Mode 2," etc.), a distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. For example, referring back to FIG. 4, the UE 402 may sense and select resources in a resource pool based on decoding SCI messages received (e.g., transmitted from the UE 404 and/or the UE 406, etc.) and performing reference signal received power (RSRP) measurements of demodulation reference signal (DMRS) inside a corresponding PSSCH or a corresponding PSCCH. After the UE 402 senses and selects resources for transmission, the UE 402 may use SCI in a PSCCH (e.g., an SCI-1, discussed in details below) and/or SCI in a PSSCH (e.g., an SCI-2, discussed in details below) to schedule and transmit the data inside the PSSCH, such as via the transmission 414. The UE 402 may transmit the PSCCH and/or the PSSCH based on a unicast mode, a groupcast mode, or a broadcast mode.

A UE receiving a sidelink transmission may provide feedback (e.g., an acknowledgement (ACK) or a negative acknowledgement (NACK)) to a UE transmitting the sidelink transmission. For example, after the UE 404 receives the transmission 414 from the UE 402, the UE 404 may send an ACK to the UE 402 via a transmission 422 (e.g., a physical sidelink feedback channel (PSFCH)) if the UE 404 successfully decodes the transmission 414. On the other hand, if the UE 404 is unable to decode or does not receive the transmission 414, the UE 404 may send a NACK to the UE 402 via the transmission 422. In one example, if the transmission 414 is a unicast or a groupcast message, the UE 404 may be configured to transmit an explicit ACK/NACK to the UE 402 indicating whether the transmission 414 is successfully decoded, e.g., the UE 404 transmits an ACK if the transmission 414 is successfully decoded and transmits a NACK if the transmission 414 is not successfully decoded. In another example, if the transmission 414 is a groupcast message, the UE 404 may be configured to transmit an implicit NACK, where the UE 404 may transmit a NACK to the UE 402 if the UE 404 is unable to decode or does not receive the transmission 414. However, the UE 404 may not transmit an ACK if the UE 404 successfully decodes the transmission 414.

Communications over sidelink channels (e.g., D2D communications) may provide various advantages and improvements for wireless communications, such as providing an ultra-low latency for communication among wireless devices. For example, in Industrial IoT (IIoT) and/or factory automation, sidelink may enable direct communications between a programmable logical controller (PLC) and multiple sensors/actuators (S/As). In some scenarios, communications between a PLC and multiple S/As in an IIoT and/or a factory automation setting may specify a stringent latency (e.g., cycle time between 1-2 ms) and a high reliability (e.g., an error rate below $10^{-6}$). In other words, the communications may be associated with traffic that is vital to certain operations or missions (i.e., mission-critical traffic), which may be deterministic and periodic. In addition, both data and control channels for the communications may be specified to meet such stringent latency and reliability. In some examples, an IIoT and/or factory automation facility may include 100 to 1000 PLCs, where each PLC may control/communicate with 20 to 50 S/As.

Figure 5:
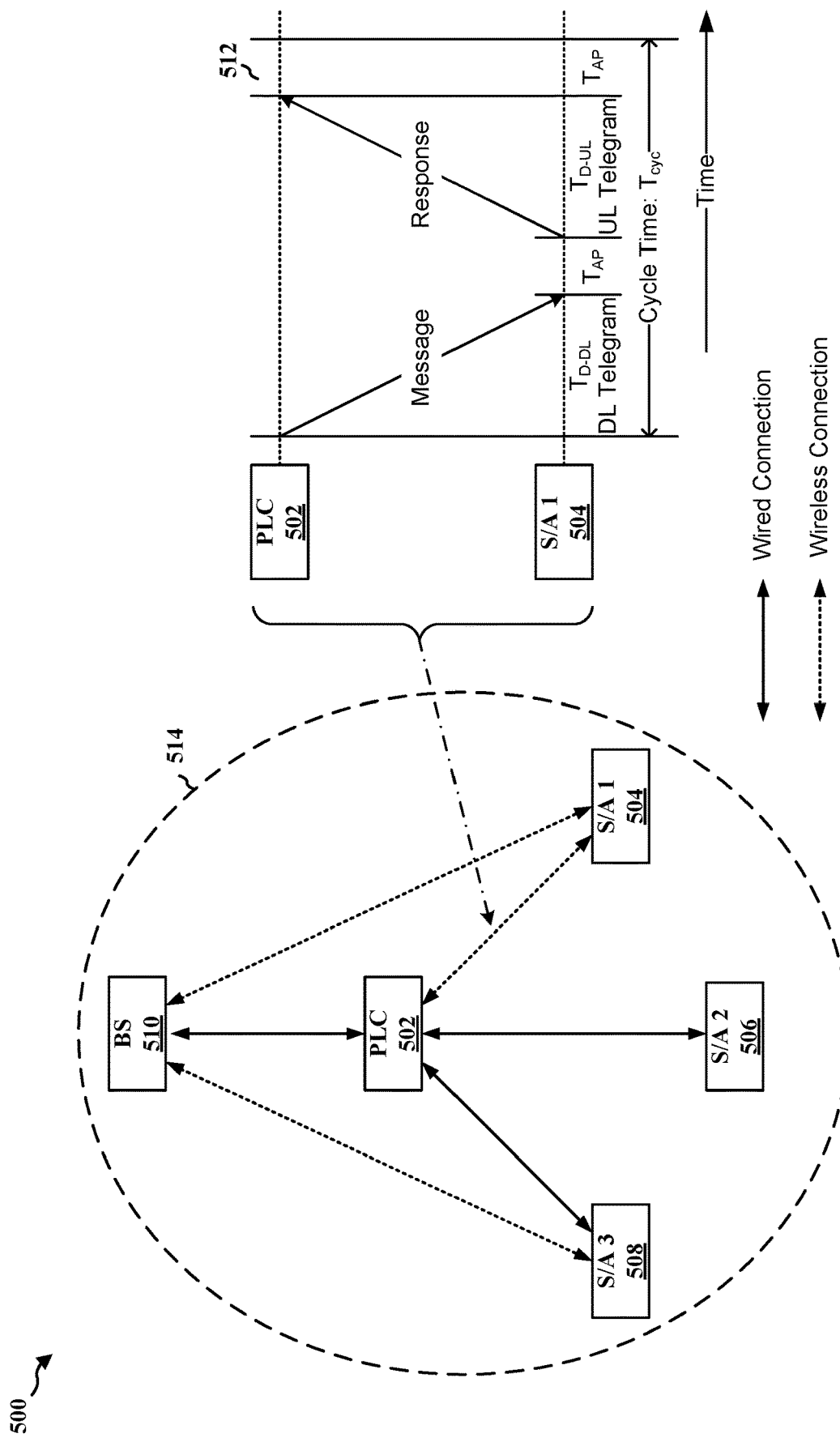
FIG. 5 is a diagram illustrating an example communication between a programmable controller logic (PLC) and multiple sensor or actuators (S/As) in accordance with various aspects of the present disclosure.

FIG. 5 is a diagram 500 illustrating an example communication between a PLC and multiple S/As in accordance with various aspects of the present disclosure. A PLC 502 may communicate with multiple S/As, such as with an S/A 504, an S/A 506, and an S/A 508, etc., and the PLC 502 may also communicate with a base station 510. In some examples, the base station 510 may also communicate with S/As directly. The PLC 502 may be configured to communicate with S/As periodically. For example, as shown at 512, the PLC 502 may periodically transmit a message to the S/A 504, such as a message requesting information (e.g., a report, a data, etc.) from the S/A 504. After receiving the message from the PLC 502, the S/A 504 may transmit a response that includes the requested information to the PLC 502. As such, there may be cyclic communication exchanges between the PLC 502 and the S/A 504. In some examples, the message transmitted by the PLC 502 and/or the response transmitted by the S/A 504 may be a small application-layer payload with a size between approximately 40 to 256 bytes, and each small application-layer payload may include various headers.

In some examples, communications between a PLC and multiple S/As may be wireless, such as based on sidelink. Making PLC connectivity wireless may significantly reduce reconfiguration cost on a factory floor and provide a flexible and simpler deployment in IIoT. For example, referring back to FIG. 5, the PLC 502 may be configured to wirelessly communicate with the base station 510 wirelessly via a Uu-interface, and the PLC 502 may also be configured to communicate with S/As (e.g., S/As 504, 506, 508, etc.) wirelessly via a PC5 interface. The PLC 502 may be configured to locate close to the machinery that is associated with the S/As, such that the S/As are within the transmission range 514 of the PLC 502. The base station 510 may be ceiling-mounted in a factory floor, such that the base station 510 may communicate with multiple PLCs, including the PLC 502, on the factory floor. As such, the PLC 502 may control/communicate with multiple S/As (e.g., S/As 504, 506, 508, etc.) wirelessly through sidelink (e.g., within transmission range 514).

Referring back to FIG. 4, in some examples, a UE may transmit SCI in multiple SCI parts, where a UE may transmit a first part of SCI (SCI-1) in a PSCCH and transmit a second part of the SCI (SCI-2) in a PSSCH, which may also be referred to as a "two stage SCI." For an example, the SCI-1 may include a resource allocation and information related to the decoding of the SCI-2, and the SCI-2 may include information related to the decoding of data (e.g., a PSSCH), etc. Therefore, a UE may indicate different control information to another UE through a combination of the SCI-1 and the SCI-2.

Figure 6:
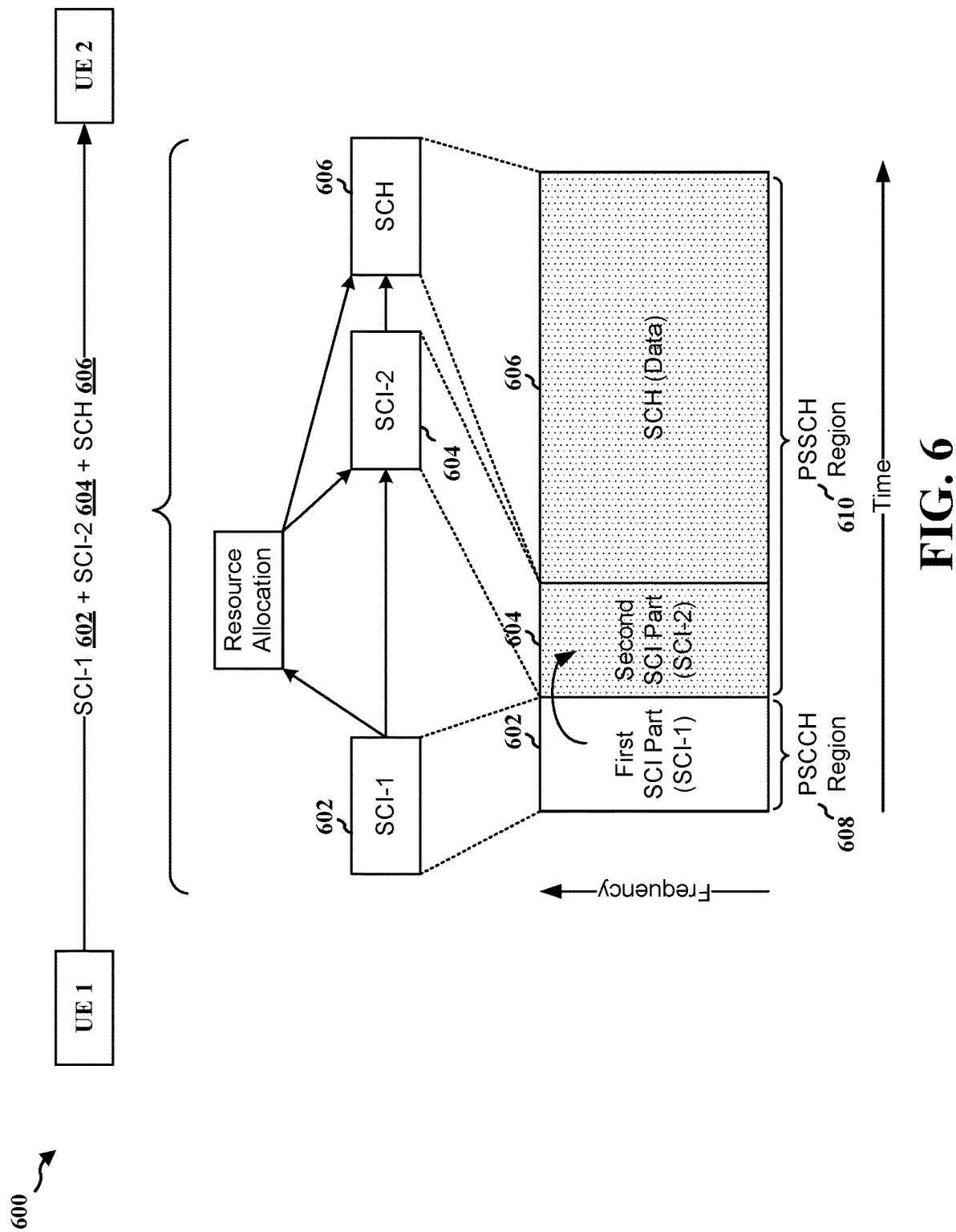
FIG. 6 is a diagram illustrating an example two-stage sidelink control information (SCI) in accordance with various aspects of the present disclosure.

FIG. 6 is a diagram 600 illustrating an example two-stage SCI in accordance with various aspects of the present disclosure. To reduce control overhead and/or to improve a processing timeline, a UE may split and transmit SCI into two parts. For example, the UE may transmit a first SCI part 602 (e.g., SCI-1) in a PSCCH region 608 of a sidelink transmission and transmit a second SCI part 604 (e.g., SCI-2) in a PSSCH region 610 of the sidelink transmission. The PSCCH region 608 and the PSSCH region 60 may together form one slot. The first SCI part 602 may include initial control information regarding a sidelink transmission, such as the resource assignment (RA) in shared channel (SCH) 606 or other resource reservation information, rank and modulation order of the sidelink assignment, etc. In addition, the first SCI part 602 may also include control information about the second SCI part 604. In some examples, the control information may indicate the number of resource elements (size) and code rate of the second SCI part 604. The control information may further indicate the location (e.g., starting resource element) and code rate of the second SCI part 604. The second SCI part 604 may include the remaining control information regarding the sidelink assignment. For example, the remaining control information may include non-time control information or other resource allocation for data transmission in SCH 606, such as the source and destination ID for the data transmission.

In one aspect, the first SCI part 602 (e.g., SCI-1) format may include one or more of the following: 1) a priority (QoS value), which may be three bits; 2) a PSSCH/frequency resource assignment (e.g., frequency/time resource for a PSSCH), the size (e.g., bits) may depend on a number of slot reservations and/or a number of subchannels; 3) a time resource assignment, e.g., five or nine bits for two or three reservations (see below); 4) a resource reservation period (e.g., if enabled), where the size (e.g., bits) may depend on a number of allowed periods; 5) a DMRS (e.g., a PSSCH DMRS and/or a PSCCH DMRS) pattern (e.g., if more than one patterns are configured), the size (e.g., bits) may depending on a number of configured patterns; 6) an SCI-2 format (e.g., information on the size of the second SCI part 604), which may be two bits; 7) a beta offset for SCI-2 rate matching, which may be two bits; 8) DM-RS port, where one bit may be used to indicate one or two data layers; 9) a modulation coding scheme (MCS), which may be five bits; 10) additional MCS table, which may be zero to two bits; 11) a PSFCH overhead indicator, which may be zero or one bit, and/or 12) one or more reserved bits (e.g., a number of bits up to upper layer), etc. The first SCI part 602 may be configured to be decoded by other sidelink UEs (e.g., such as UEs in Mode 2 resource allocation) to allow/enable channel sensing and/or to avoid resource collision.

In another aspect, the second SCI part 604 (e.g., SCI-2) format may include one or more of the following: 1) a HARQ ID, where the size (e.g., bits) may depend on a number of HARQ processes; 2) a new data indicator (NDI), which may be one bit; 3) a redundancy version (RV)-identifier (ID) (RV-ID), which may be two bits; 4) a source ID (e.g., a transmitting UE ID), which may be eight bits; 5) a destination ID (e.g., a receiving UE ID), which may be sixteen bits; 6) a HARQ enable/disable indication, which may be 1 bit; 7) SCI-2-A exclusive fields that indicate a cast type (e.g., a broadcast, a groupcast or a unicast), which may be two bits, and/or indicate a CSI request, which may be one bit; and/or 8) SCI-2-B exclusive fields (e.g., for NACK-exclusive groupcast) that indicate a Zone ID, which may be 12 bits, and/or indicate a communication range, which may be 4 bits, etc. The SCI-2-A may refer to a $2^{nd}$-stage SCI A$^{th}$ type, and the SCI-2-B may refer to a $2^{nd}$-stage SCI B$^{th}$ type. The second SCI part 604 may be used by a receiving device for decoding the associated PSSCH.

Figure 7:
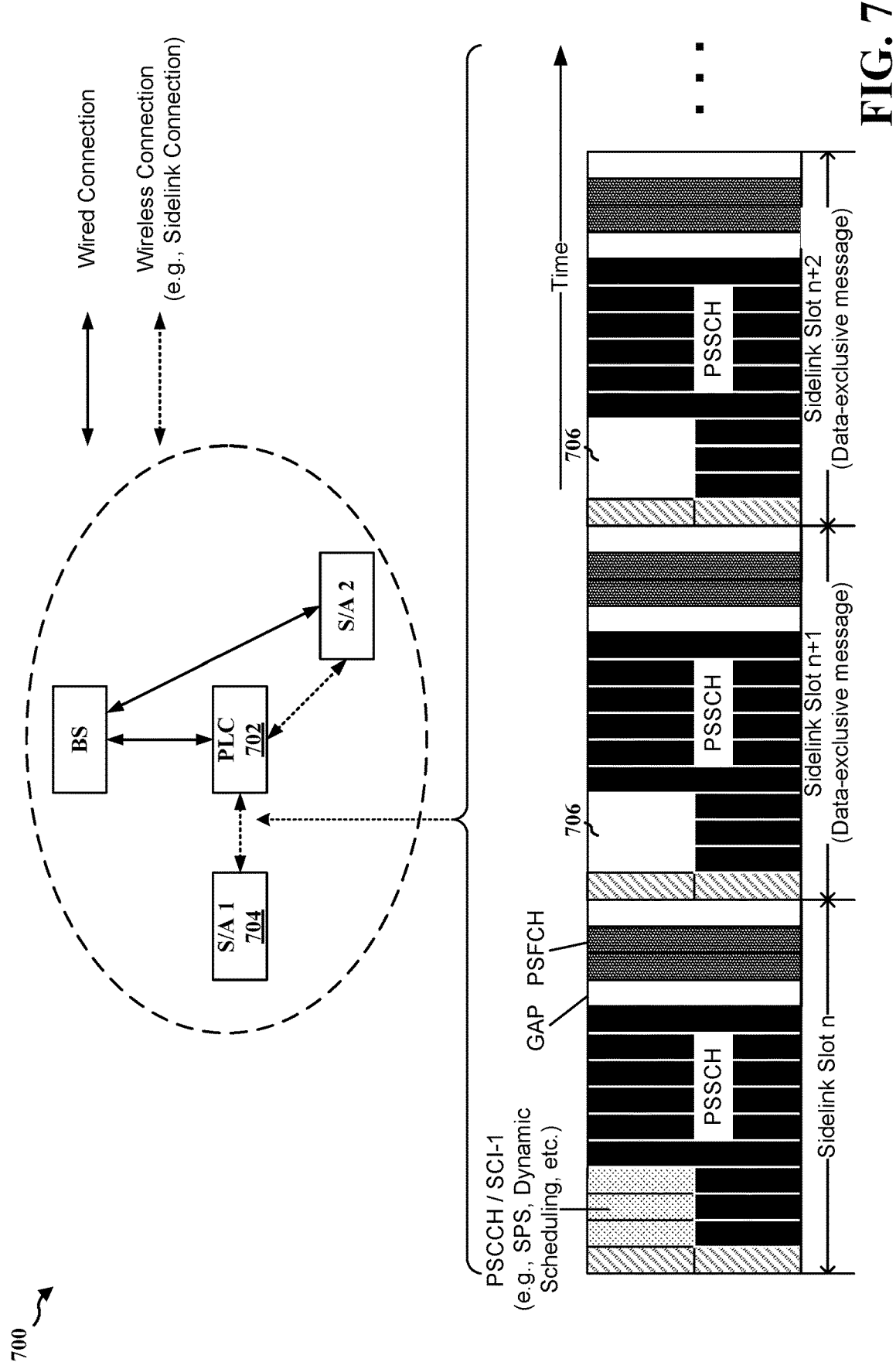
FIG. 7 is a diagram illustrating an example of a semi-persistent scheduling (SPS) in accordance with various aspects of the present disclosure.

In some examples, to reduce processing overhead of SCI transmission and/or to minimize overhead due to various headers, a sidelink device (e.g., a UE, a PLC, an S/A, etc.) may be configured to transmit data based on a semi-persistent scheduling (SPS). FIG. 7 is a diagram 700 illustrating an example of an SPS in accordance with various aspects of the present disclosure. A PLC 702 may schedule an SPS for an S/A 704 via a PSCCH (e.g., SCI-1), where the PLC 702 may allocate resources (e.g., SPS resources) for the S/A 704 to receive data (e.g., for forward-link grant) and/or to transmit data (e.g., for reverse-link grant) over a period of time or until another scheduling configuration is received by the S/A 704. For example, at slot n, the PLC 702 may transmit an SPS configuration to the S/A 704 that indicates a forward-link grant and resources (e.g., a PSSCH) associated with the forward-link grant. Then, based on the SPS configuration, the S/A 704 may receive PSSCHs from the PLC 702 in slot n and the following slots (e.g., slot n+1, slot n+2, and so on) without receiving additional control information (e.g., SCI, a PDCCH, etc.) from the PLC 702. In other words, after the S/A 704 applies the SPS configuration, the S/A 704 may communicate with the PLC 702 based on data-exclusive message(s), which may also be referred to as "data message(s)/traffic(s)," "data-only message(s)/traffic(s)" and/or "data message(s)/traffic(s) without control information," etc. In some examples, such communication or transmission mechanism may also be referred to as an SCI-scheduled SPS transmission (Tx).

In other examples, the scheduling may also be based on dynamic scheduling instead of SPS, where the PLC 702 may schedule sidelink resources for the S/A 704 when there is data to be transmitted or received. For example, if the PLC 702 is requesting a data from the S/A 704, the PLC 702 may transmit a dynamic scheduling configuration to the S/A 704 via a PSCCH at slot n that schedules resources for the S/A 704 to transmit over a period of time (e.g., from slot n to slot n+5, etc.). Then, based on the dynamic scheduling configuration, the S/A 704 may transmit the requested data to the PLC 702 over the period of time without receiving additional control information (e.g., SCI, PDCCH, etc.) from the PLC 702. In some examples, such communication or transmission mechanism may also be referred to as an SCI-scheduled dynamic Tx.

While SCI-scheduled SPS Tx and/or SCI-scheduled dynamic Tx on sidelink with data alone (e.g., a data-exclusive message) for forward-link grant and/or for reverse-link grant may reduce processing overhead of SCI transmission, as shown at 706, the unused SCI resources (e.g., PSCCH) related to the data-exclusive message (e.g., data-only Tx) may be wasted in some scenarios.

Figure 8:
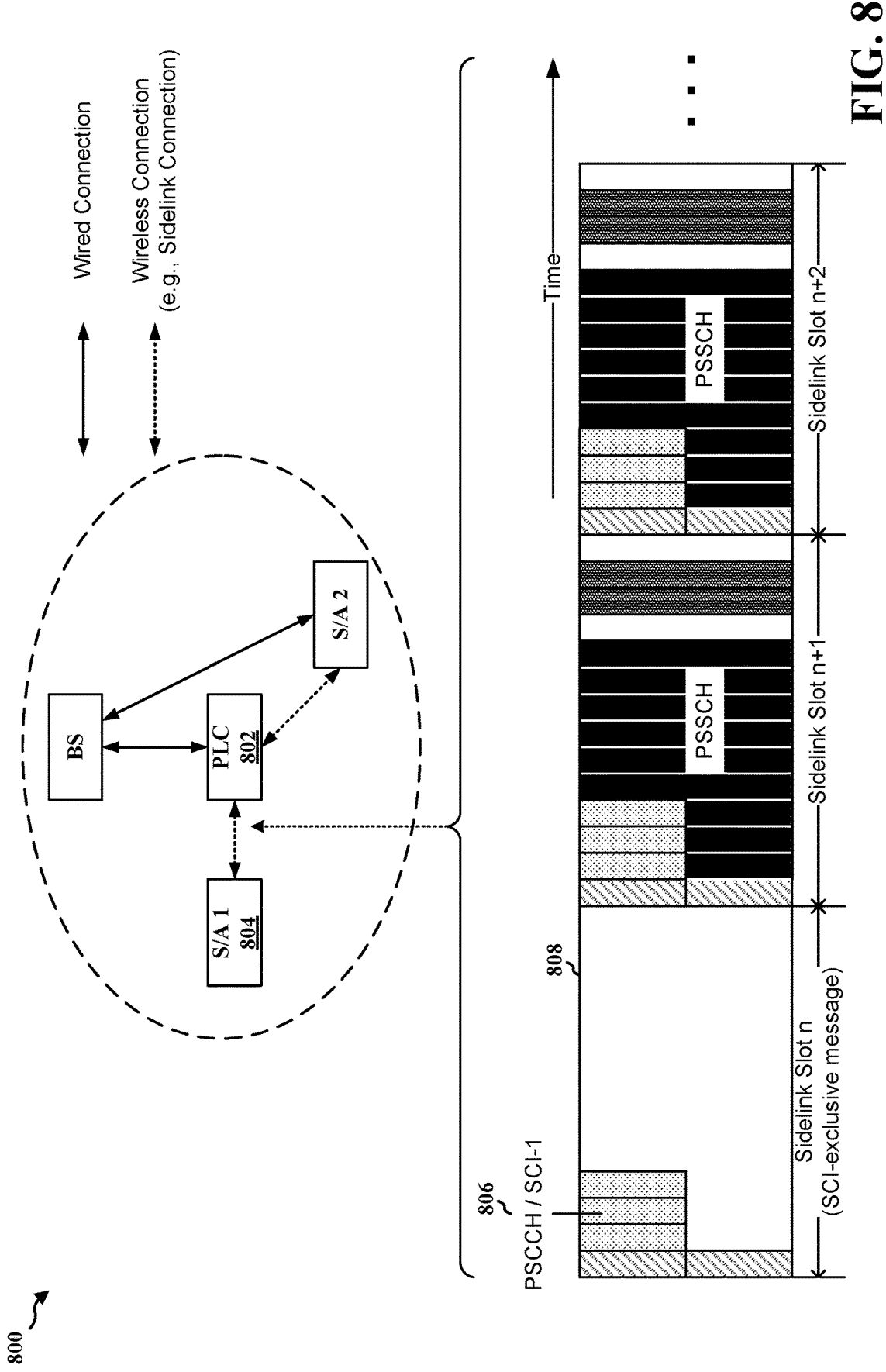
FIG. 8 is a diagram illustrating an example of an SCI-exclusive grant in accordance with various aspects of the present disclosure.

In some examples, some sidelink devices, such as S/As, may have reduced or limited capabilities to process complex scheduling and/or large overhead. Thus, to reduce S/A scheduling overhead and/or to reduce S/A scheduling complexity, a PLC may be configured to transmit an SCI-exclusive grant (e.g., an SCI-exclusive message) to an S/A to schedule transmission(s) from the S/A. FIG. 8 is a diagram 800 illustrating an example of an SCI-exclusive grant in accordance with various aspects of the present disclosure. In one example, if a PLC 802 is requesting a data from an S/A 804, which may be a sidelink device with limited or reduced capabilities, the PLC 802 may transmit an SCI-exclusive message (e.g., a transmission with a PSCCH and without a PSSCH/PSFCH) to the S/A 804, such as shown at 806. The SCI-exclusive message may enable the PLC 802 to configure sidelink resources (e.g., PSSCH) for the S/A 804 to transmit the data requested by the PLC 802 with reduced S/A scheduling overhead. In some examples, the SCI-exclusive message may also be referred to as an "SCI-only message," an "SCI-exclusive grant," an "SCI-only grant," a "control message," and/or a "control message without data," etc. In some examples, such communication or transmission mechanism may also be referred to as an SCI-exclusive Tx or an SCI-only Tx. Similarly, while an SCI-exclusive message may reduce an S/A scheduling overhead, as shown at 808, the unused data resources (e.g., PSSCH resources) corresponding to the SCI-exclusive grant (e.g., SCI-only Tx) may be wasted in some scenarios.

Aspects presented herein may improve sidelink resource allocation and utilization for sidelink devices. Aspects presented herein may enable a transmitting sidelink device to multiplex an SCI-exclusive message (e.g., as described in connection with FIG. 8) with a data-exclusive message to improve resource utilization. For example, in some scenarios or network configurations, a transmitting device may be configured to multiplex SCI with a corresponding PSSCH (e.g., the PSSCH is scheduled by the SCI) in a slot. In other words, the transmitting device may not multiplex SCI with a non-corresponding PSSCH in a slot. If the transmitting device is transmitting an SCI-exclusive message, the transmitting device may be configured to transmit the SCI-exclusive message in a slot separated from a slot including a non-corresponding PSSCH, which may be a waste of resources. Thus, by enabling a UE to multiplex an SCI-exclusive message with a data-exclusive message, an improved resource use efficiency may be achieved. In addition, the transmitting sidelink device may indicate to a receiving sidelink device that SCI (e.g., a PSCCH) and data (e.g., a PSSCH) in a slot are not coupled, such that the receiving sidelink device may be aware that the SCI is not associated with the PSSCH or is not used for scheduling the PSSCH in the slot. As such, the receiving device may conserve its power and improve sidelink communication reliability by monitoring the SCI and/or the PSSCH based on the indication. For example, when SCI is coupled to a PSSCH, a receiving device may be configured to monitor and decode both the SCI and the PSSCH. However, if the receiving device is able to determine the SCI is not coupled with the data, the receiving device may be configured to decode the SCI without decoding data or to decode the data without decoding SCI, etc. Thus, the receiving device may spend less time and/or resource monitoring for SCI or data unrelated to the receiving device.

Figure 9:
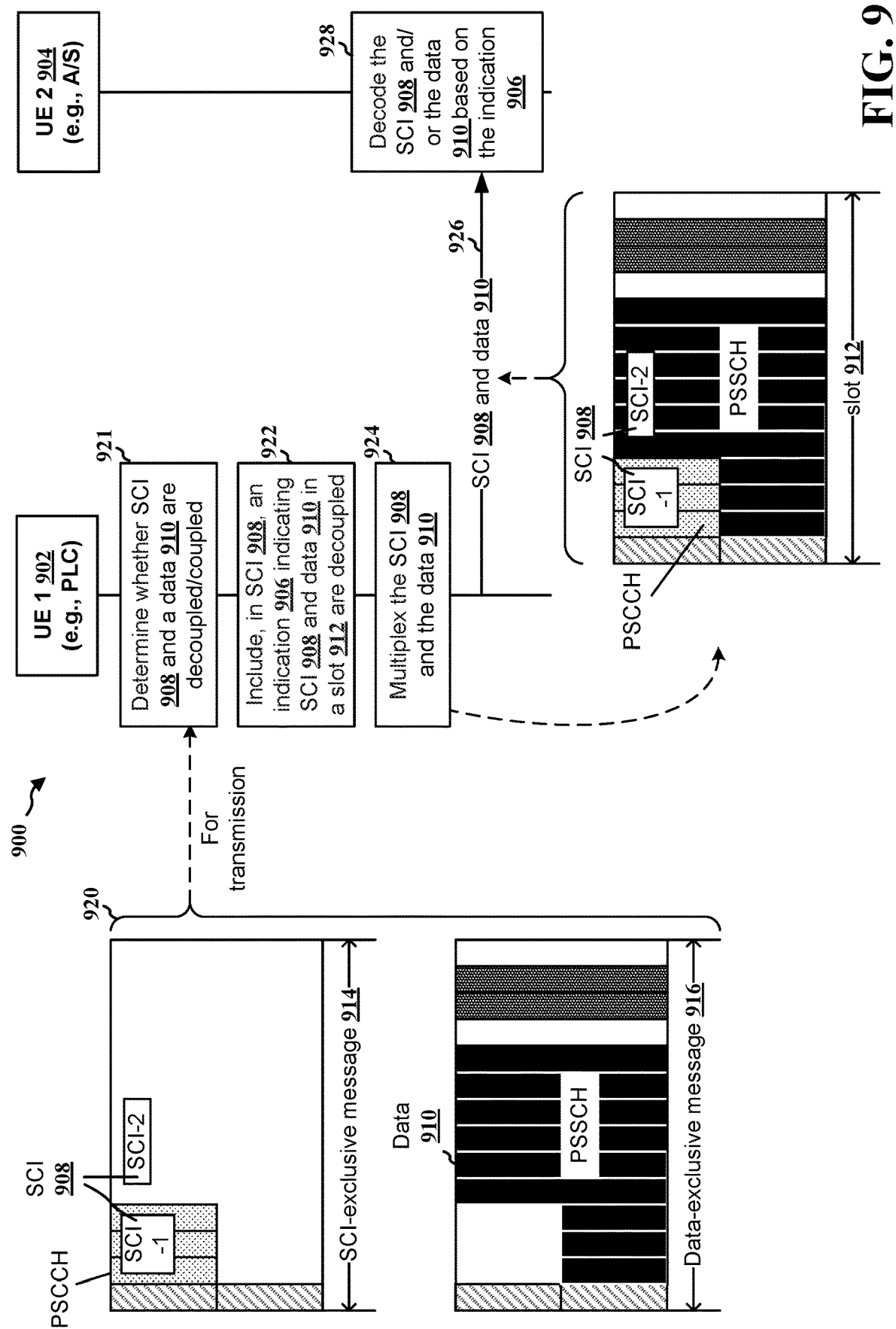
FIG. 9 is a communication flow illustrating an example of a UE multiplexing an SCI-exclusive message with a data-exclusive message in accordance with various aspects of the present disclosure.

FIG. 9 is a communication flow 900 illustrating an example of a UE multiplexing an SCI-exclusive message with a data-exclusive message in accordance with various aspects of the present disclosure. The numberings associated with the communication flow 900 do not specify a particular temporal order and are merely used as references for the communication flow 900.

At shown at 920, a first UE 902 (e.g., a first sidelink device, a PLC, etc.) may determine to or may be configured to transmit an SCI-exclusive message 914 (e.g., as described in connection with FIG. 8) and a data-exclusive message 916 (e.g., as described in connection with FIG. 7) in a slot 912 or in multiple slots to one or more UEs, which may include a second UE 904 (e.g., a second sidelink device, an S/A, etc.). The SCI-exclusive message 914 may be associated with (e.g., included in) an SCI 908 (e.g., a PSCCH) and may not contain any data. On the other hand, the data-exclusive message 916 may be associated with a data 910 (e.g., a PSSCH) and does not contain any control information. For example, the data-exclusive message 916 may be associated with SPS and/or dynamic scheduling as described in connection with FIG. 7. As shown at 921, the first UE 902 may also determine whether the SCI 908 and the data 910 are decoupled/coupled based at least part on the SCI-exclusive message 914 and/or the data-exclusive message 916, e.g., the first UE 902 may determine whether the SCI 908 schedules the data 910.

In one example, the SCI-exclusive message 914 may include or may be a pre-emption indication, a transmit power control for a PSSCH and a PSCCH, a transmit power control for a sounding reference signal (SRS) associated with sidelink positioning or an SRS request, a sidelink cancellation indication, and/or a notification notifying power saving information outside discontinuous reception (DRX) active time for one or more sidelink UEs, etc. As shown at 920, the SCI 908 may include a first part SCI (e.g., SCI-1) that is to be transmitted in a PSCCH region and a second part SCI (e.g., SCI-2) that is to be transmitted in a PSSCH region, such as described in connection with FIG. 6.

At 922, the first UE 902 may include an indication 906 (e.g., a control-exclusive indicator, a control-only indicator, etc.) in the SCI 908 (e.g., via at least one of SCI-1 or SCI-2 associated with the SCI 908), where the indication 906 may indicate that the SCI 908 and the data 910 (e.g., a PSSCH) in the slot 912 are decoupled. In other words, the indication 906 may indicate that the SCI 908 may not be associated with the data 910, such that the second UE 904 may process and decode the data 910 without basing on (or independent of) the SCI 908. In some aspects, indication 906 may indicate whether the SCI 908 and the data 910 are coupled or decoupled. For example, if indication 906 indicates the SCI 908 and the data 910 are decoupled, SCI in a sidelink transmission may be configured to couple with data in a same slot, where the SCI may include information related to the decoding of the data. In other words, when the SCI 908 and PSSCH are coupled in a same slot, the SCI 908 may reserve resources for the PSSCH in the same slot. Thus, a UE receiving the sidelink transmission may first decode the SCI, and then the UE may decode the data based on information obtained from the SCI. However, if indication 906 indicates that the SCI 908 and the data 910 are decoupled, then the SCI 908 does not reserve resources for the PSSCH in the same slot or include information related to the decoding of the data. Thus, the UE may be configured not to decode the PSSCH based on that SCI when the PSSCH and SCI are decoupled. As such, a UE may be enabled/configured to transmit an SCI-exclusive message on a slot that contains data-exclusive traffic by including a control-exclusive indicator (e.g., indicator 906) in at least one of SCI-1 or SCI-2 to indicate that the SCI(s) and the PSSCH data are decoupled. Accordingly, rather than having to transmit an SCI-exclusive message with unused PSSCH resources because the SCI is coupled to the PSSCH in the same slot, the indication 906 enables the SCI-exclusive message 914 to be decoupled from the PSSCH and the PSSCH resources in the same slot may be used to send data-exclusive traffic. In this way, the indication 906 may allow for more efficient use of resources by multiplexing SCI-only traffic with different types of (or any) data-only sidelink.

In some aspects, the indication 906 may be implicitly included in SCI 908. For example, the indication 906 may be an implicit indication based on different cyclic redundancy check (CRC) scrambling of SCI 908 (e.g., SCI-1 and/or SCI-2) preconfigured for different SCI-exclusive messages. For example, a first type of CRC scrambling may be associated with SCI and data coupled and a second type of CRC scrambling may be associated with SCI and data decoupled. Thus, if the second UE 904 receives the SCI 908 that is scrambled with the first type of CRC scrambling, the second UE 904 may determine that the SCI and data are coupled. However, if the second UE 904 receives the SCI 908 that is scrambled with the second type of CRC scrambling, the second UE 904 may determine that the SCI and data are decoupled.

In another aspect of the present disclosure, the indication 906 may be an implicit indication based on different SCI formats (e.g., different SCI-1 and/or SCI-2 formats) defined for different SCI-exclusive messages. For example, a first SCI format may be associated with SCI and data coupled and a second SCI format may be associated with SCI and data decoupled. Thus, if the second UE 904 receives the SCI 908 that is configured with the first SCI format, the second UE 904 may determine that the SCI and data are coupled. However, if the second UE 904 receives the SCI 908 that is configured with the second SCI format, the second UE 904 may determine that the SCI and data are decoupled.

In some aspects, the indication 906 may be explicitly included in SCI 908. For example, the indication 906 may be an explicit bit in the SCI 908 (e.g., one bit in SCI-1 or SCI-2) that indicates the SCI 908 and the data 910 are decoupled (e.g., bit zero indicates SCI and data are coupled and bit one indicates SCI and data are decoupled). In other words, an explicit bit in SCI-1 or SCI-2 may indicate that the corresponding SCI(s) contain no data part (e.g., the SCI 908 is associated with an SCI-exclusive message).

In another aspect of the present disclosure, the indication 906 may be one or more explicit bits in the SCI 908 (e.g., one or more bits in SCI-1 or SCI-2) that specify the type of SCI-exclusive message in a remaining part of the SCI 908 (e.g., the remaining part of SCI-1 and/or SCI-2. For example, a two bits in a remaining part of SCI-1 may indicate that the corresponding SCI(s) contain no data part (e.g., the SCI 908 is associated with an SCI-exclusive message).

In another aspect of the present disclosure, the first UE 902 may be configured to include the indication 906 in either SCI-1 or SCI-2 if the first UE 902 is transmitting the SCI 908 and the data 910 based on sidelink transmission Mode 1, such as described in connection with FIG. 4. For example, a base station may determine resources for sidelink communication and may allocate resources to the first UE 902 for sidelink transmissions (e.g., for transmitting SCI 908 and the data 910), such as via an RRC configuration or a DCI message. The DCI message may be a DCI format 3_0 message that may be used for scheduling a PSCCH and a PSSCH in one cell, and the CRC of the DCI message may be scrambled by a sidelink-radio network temporary identifier (SL-RNTI) or a sidelink-configured scheduling-network temporary (SL-CS-RNTI). In one example, a DCI format 3_0 message may include one or more of: a resource pool index, a time gap, a HARQ process ID, a new data indicator, a lowest index of a subchannel allocation to an initial transmission, a 1st-stage SCI (e.g., SCI-1) format fields (e.g., which may frequency resource assignment and/or time resource assignment, etc.), a PSFCH-to-HARQ feedback timing indicator, a PUCCH resource indicator, a configuration index (e.g., for configured grant (CG)), and/or a counter sidelink assignment index, etc.

In another aspect of the present disclosure, if the first UE 902 is transmitting the SCI 908 and the data 910 based on sidelink transmission Mode 2, where the first UE 902 may autonomously determine resources to use for sidelink transmission based on channel sensing (e.g., based on decoding SCI(s) from other UE(s)), the first UE 902 may be configured to transmit the indication 906 in SCI-2 but not in SCI-1. For example, when the SCIs and PSSCH data are decoupled, the accuracy of channel sensing in sidelink transmission Mode 2 may decrease as a transmitter UE (e.g., the first UE 902) may not necessarily indicate the resource reservation associated with the current slot. As such, if the first UE 902 is operating under the sidelink transmission Mode 2, the first UE 902 may transmit the indication 906 in SCI-2 such that the SCI-1 and the PSSCH data in a same slot may remain coupled, and the accuracy of channel sensing in the sidelink transmission Mode 2 may not be affected. In other words, the first UE 902 may include the control-exclusive indicator (e.g., the indication 906) in SCI-2 to conveying that the SCI 908 is associated with SCI-exclusive message(s) (e.g., the SCI-exclusive message 914).

At 924, the first UE 902 may multiplex the SCI 908 with the data 910. In other words, the first UE 902 may multiplex the SCI 908, which includes the SCI-exclusive message 914 and the indication 906, with the data-exclusive message 916 (or on a data-exclusive traffic).

At 926, the first UE 902 may transmit the multiplexed SCI 908 and data 910 to one or more UEs at slot 912, such as to the second UE 904 (e.g., via unicast, groupcast, broadcast, etc.). The second UE 904 may decode the data 910 without basing on (or independent of) the SCI 908 as the second UE 904 may have determined that that the SCI 908 and the data 910 are decoupled based on indication 906 included in the SCI 908. In some aspects, the SCI 908 and data 910 may be transmitted separately. For example, if the SCI 908 and PSSCH have different waveforms, the SCI 908 and PSSCH may be transmitted separately.

At 928, after receiving the SCI 908 and the data 910 from the first UE 902, the second UE 904 may decode the data 910 and/or the SCI 908 based at least in part on the indication 906. As such, aspects presented herein may enable the first UE 902 to multiplex an SCI-exclusive message with a data-exclusive message to improve resource utilization. In addition, the first UE 902 may indicate to the second UE 904 that SCI (e.g., a PSCCH) and data (e.g., a PSSCH) in a slot are decoupled, such that the second UE 904 may be aware that the SCI is not associated with the PSSCH or is not used for scheduling the PSSCH in the slot, and the second UE 904 may decode the SCI and/or the PSSCH based on the indication.

Figure 10:
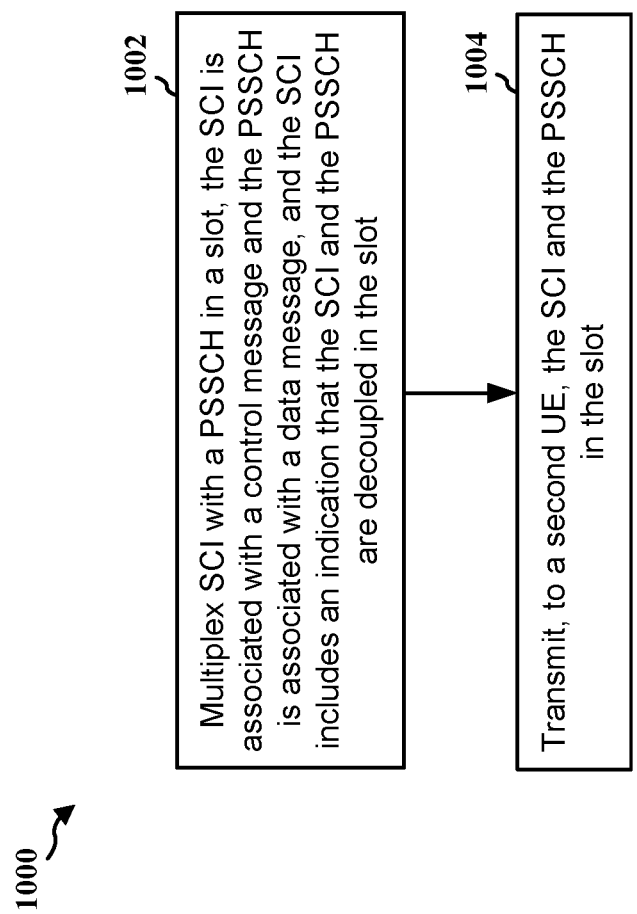
FIG. 10 is a flowchart of a method of wireless communication in accordance with aspects presented herein.

FIG. 10 is a flowchart 1000 of a method of wireless communication. The method may be performed by a UE or a component of a UE (e.g., the UE 104, 402; the device 350; the PLC 502, 702, 802; the first UE 902; the apparatus 1102; a processing system, which may include the memory 360 and which may be the entire device 350 or a component of the device 350, such as the TX processor 368, the RX processor 356, and/or the controller/processor 359). The method may enable the UE to multiplex an SCI-exclusive message with a data-exclusive message/traffic and transmit an indication indicating the SCI-exclusive message is not associated with data.

At 1002, a first UE may multiplex SCI with a PSSCH in a slot, the SCI may be associated with a control message and the PSSCH may be associated with a data message, and the SCI may include an indication that the SCI and the PSSCH are decoupled in the slot, such as described in connection with FIG. 9. For example, at 922, the first UE 902 may include an indication 906 in the SCI 908 (e.g., in SCI-1 or SC1-2) indicating that the SCI 908 and the data 910 in the slot 912 are decoupled. At 924, the first UE 902 may multiplex the SCI 908 with the data 910. The multiplexing of the SCI with the PSSCH may be performed by, e.g., the SCI and data decoupled indication component 1140, the SCI and data multiplexing component 1142, and/or the transmission component 1134 of the apparatus 1102 in FIG. 11.

In one example, the control message may be an SCI-only message, and the data message may be a data-only message.

In another example, the control message may include at least one of: a pre-emption indication, a transmit power control for the PSSCH and a PSCCH, a transmit power control for an SRS associated with sidelink positioning or an SRS request, a sidelink cancellation indication, or a notification of power saving information outside a DRX active time for one or more UEs.

In another example, the indication may be based at least in part on CRC scrambling associated with the control message, based at least in part on an SCI format associated with the control message, and/or based at least in part on one or more bits in the SCI indicating that the SCI and the PSSCH are decoupled in the slot.

In another example, the SCI may be a first part SCI (SCI 1) or a second part SCI (SCI 2), where the SCI 1 may be transmitted on a PSCCH and the SCI 2 may be transmitted on the PSSCH. In one example, the indication may be transmitted via the SCI 1 or the SCI 2 if the SCI and the PSSCH are transmitted to the second UE based at least in part on a sidelink transmission mode 1. In another example, the indication may be transmitted via the SCI 2 if the SCI and the PSSCH are transmitted to the second UE based at least in part on a sidelink transmission mode 2.

At 1004, the first UE may transmit, to a second UE, the SCI and the PSSCH in the slot, such as described in connection with FIG. 9. For example, at 926, the first UE 902 may transmit the SCI 908 and the data 910 to the second UE 904. The transmission of the SCI and PSSCH may be performed by, e.g., the SCI and data configuration component 1144 and/or the transmission component 1134 of the apparatus 1102 in FIG. 11.

Figure 11:
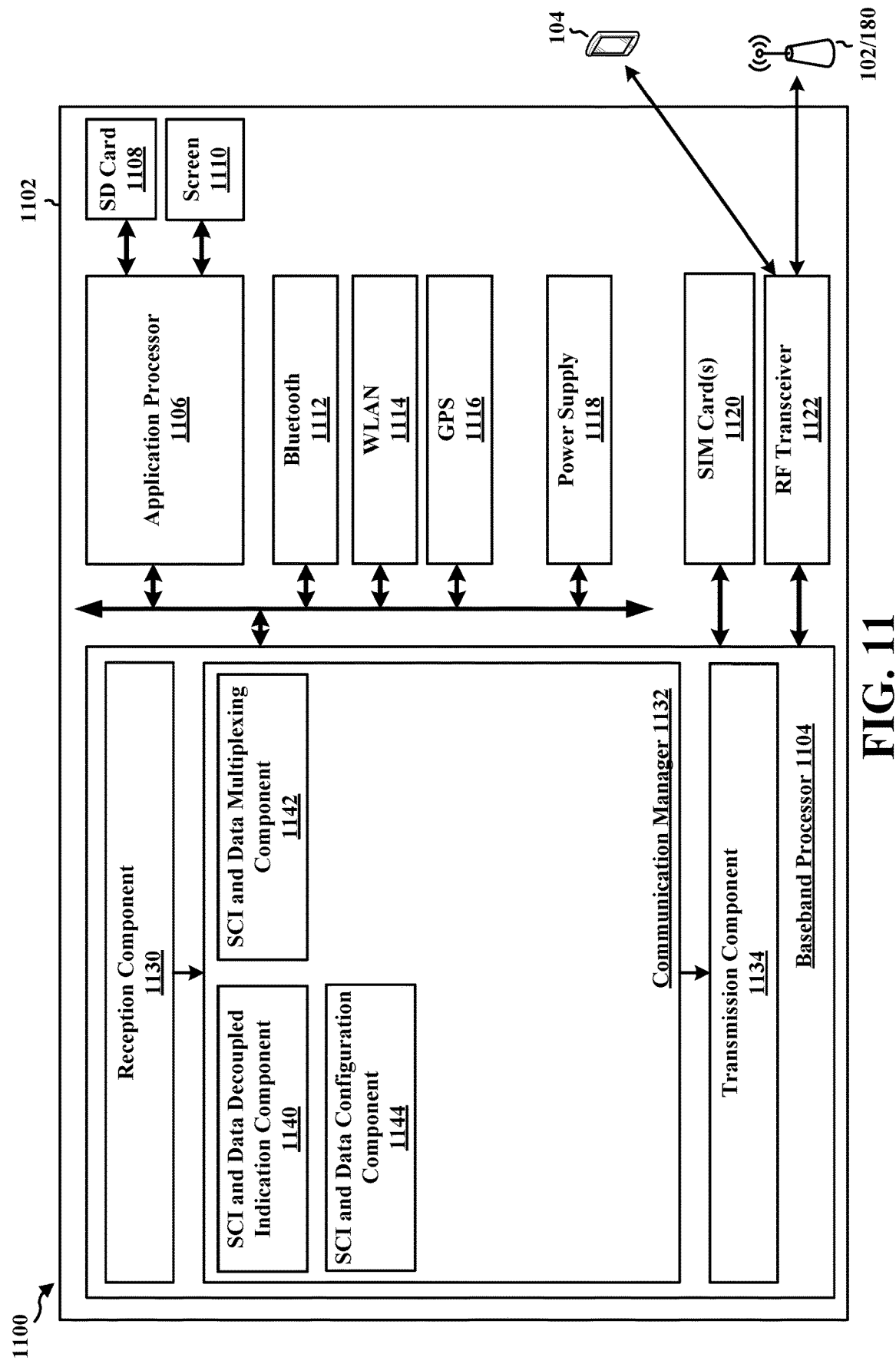
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a baseband processor 1104 (also referred to as a modem) coupled to a RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described supra. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the UE (e.g., of the device 350) and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an SCI and data decoupled indication component 1140 and/or an SCI and data multiplexing component 1142 that are configured to multiplex SCI with a PSSCH in a slot, the SCI being associated with a control message and the PSSCH being associated with a data message, and the SCI including an indication that the SCI and the PSSCH are decoupled in the slot, e.g., as described in connection with 1002 of FIG. 10. The communication manager 1132 further includes an SCI and data configuration component 1144 that is configured to transmit, to a second UE, the SCI and the PSSCH in the slot, e.g., as described in connection with 1004 of FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband processor 1104, includes means for multiplexing SCI with a PSSCH in a slot, the SCI being associated with a control message and the PSSCH being associated with a data message, and the SCI including an indication that the SCI and the PSSCH are decoupled in the slot (e.g., the SCI and data decoupled indication component 1140, the SCI and data multiplexing component 1142, and/or the transmission component 1134). The apparatus 1102 includes means for transmitting, to a second UE, the SCI and the PSSCH in the slot (e.g., the SCI and data configuration component 1144 and/or the transmission component 1134).

In one configuration, the control message may be an SCI-only message, and the data message may be a data-only message.

In another configuration, the control message may include at least one of: a pre-emption indication, a transmit power control for the PSSCH and a PSCCH, a transmit power control for an SRS associated with sidelink positioning or an SRS request, a sidelink cancellation indication, or a notification of power saving information outside a DRX active time for one or more UEs.

In another configuration, the indication may be based at least in part on CRC scrambling associated with the control message, based at least in part on an SCI format associated with the control message, and/or based at least in part on one or more bits in the SCI indicating that the SCI and the PSSCH are decoupled in the slot.

In another configuration, the SCI may be a first part SCI (SCI 1) or a second part SCI (SCI 2), where the SCI 1 may be transmitted on a PSCCH and the SCI 2 may be transmitted on the PSSCH. In such a configuration, the indication may be transmitted via the SCI 1 or the SCI 2 if the SCI and the PSSCH are transmitted to the second UE based at least in part on a sidelink transmission mode 1. In such a configuration, the indication may be transmitted via the SCI 2 if the SCI and the PSSCH are transmitted to the second UE based at least in part on a sidelink transmission mode 2.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
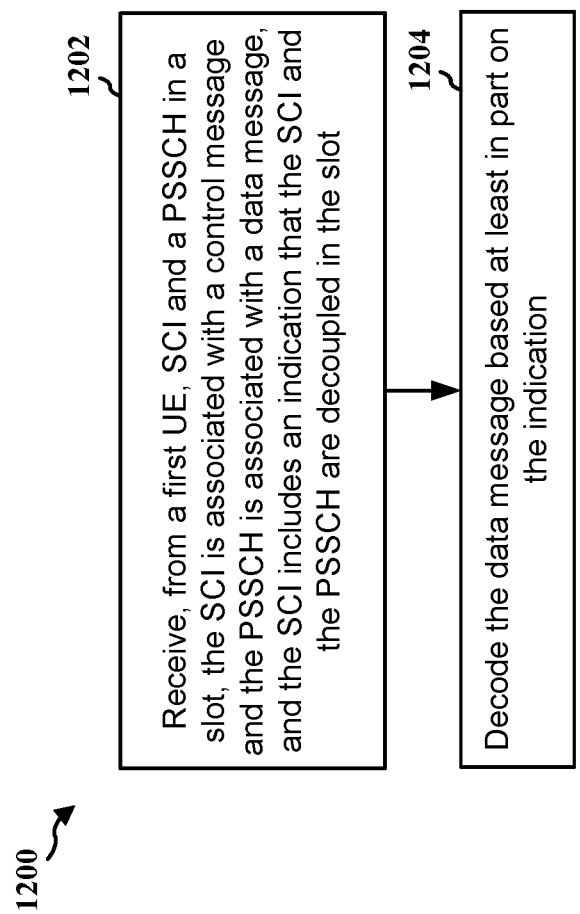
FIG. 12 is a flowchart of a method of wireless communication in accordance with aspects presented herein.

FIG. 12 is a flowchart 1200 of a method of wireless communication. The method may be performed by a UE or a component of a UE (e.g., the UE 104, 404; the device 350; the S/A 504, 704, 804; the second UE 904; the apparatus 1302; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the UE to receive and process SCI and data that are not coupled in a slot.

At 1202, a second UE may receive, from a first UE, SCI and a PSSCH in a slot, the SCI being associated with a control message and the PSSCH being associated with a data message, and the SCI including an indication that the SCI and the PSSCH are decoupled in the slot, such as described in connection with FIG. 9. For example, at 926, the second UE 904 may receive the SCI 908 and the data 910 in a slot from the first UE 902. The second UE 904 may receive an indication 906 from the first UE 902 in SCI 908 indicating that the SCI 908 and the data 910 in the slot 912 are decoupled (e.g., via SCI-1 or SCI-2). The reception of the indication and/or the reception of the SCI and the PSSCH in a slot may be performed by, e.g., the decoupled indication process component 1340 and/or the reception component 1330 of the apparatus 1302 in FIG. 13.

In one example, the control message may be an SCI-only message, and the data message may be a data-only message.

In another example, the control message may include at least one of: a pre-emption indication, a transmit power control for the PSSCH and a PSCCH, a transmit power control for an SRS associated with sidelink positioning or an SRS request, a sidelink cancellation indication, or a notification of power saving information outside a DRX active time for one or more UEs.

In another example, the indication may be based at least in part on CRC scrambling associated with the control message, based at least in part on an SCI format associated with the control message, and/or based at least in part on one or more bits in the SCI indicating that the SCI and the PSSCH are decoupled in the slot.

In another example, the SCI may be a first part SCI (SCI 1) or a second part SCI (SCI 2), the SCI 1 may be received on a PSCCH and the SCI 2 may be received on the PSSCH. In such an example, the indication may be received via the SCI 1 or the SCI 2 if the SCI and the PSSCH are transmitted by the first UE based at least in part on a sidelink transmission mode 1. In such an example, the indication may be received via the SCI 2 if the SCI and the PSSCH are transmitted by the first UE based at least in part on a sidelink transmission mode 2.

At 1204, the second UE may decode the data message based at least in part on the indication, such as described in connection with FIG. 9. For example, at 926, the second UE 904 may receive the SCI 908 and the data 910 from the first UE 902, and at 928, the second UE 904 may decode the SCI 908 and/or the data 910 based on the indication 906. The reception of the SCI and the PSSCH may be performed by, e.g., the SCI and data decode component 1342 and/or the reception component 1330 of the apparatus 1302 in FIG. 13.

Figure 13:
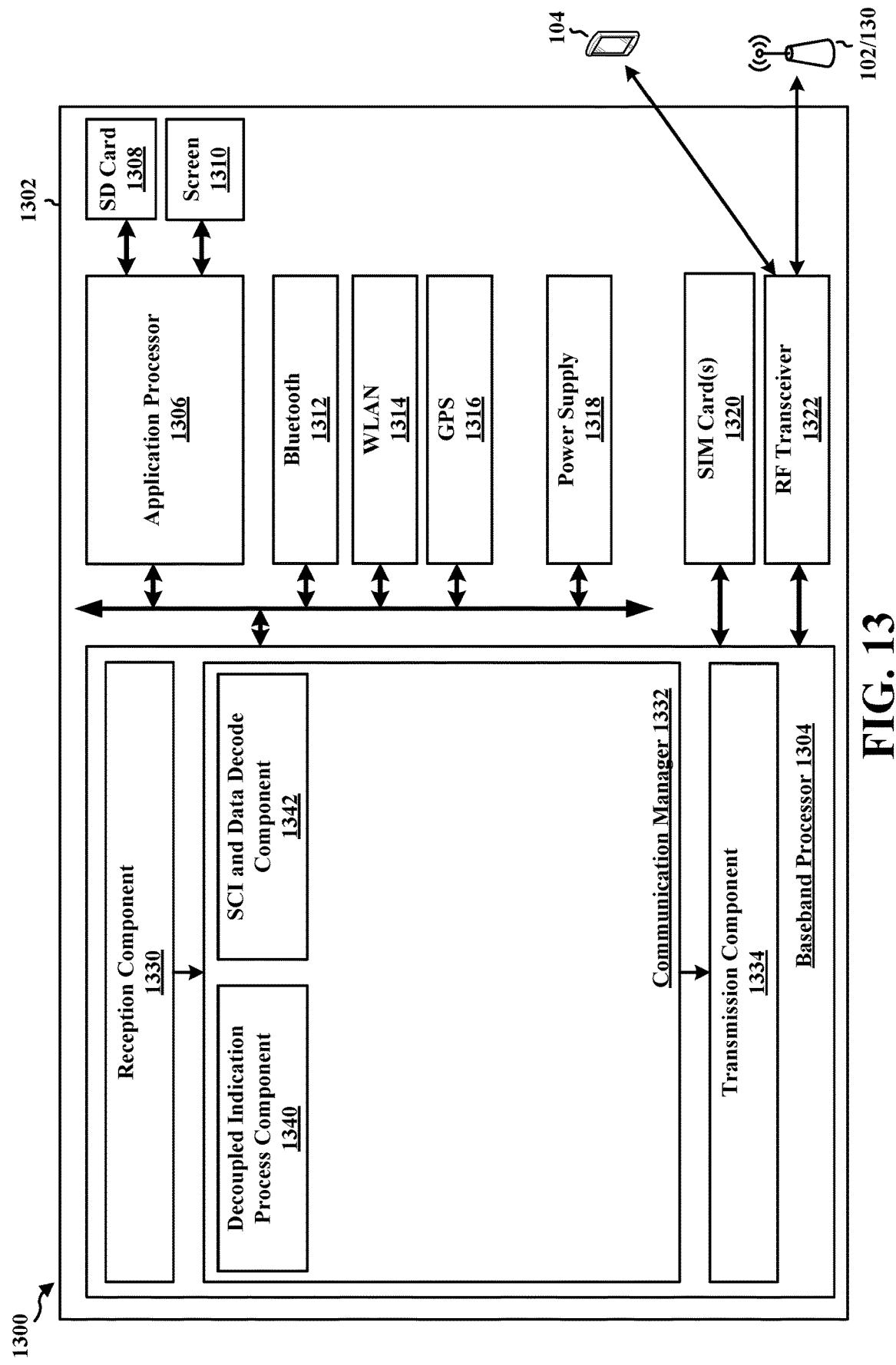
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a baseband processor 1304 (also referred to as a modem) coupled to a RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the UE (e.g., a component of the device 350) and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a decoupled indication process component 1340 that is configured to receive, from a first UE, SCI and a PSSCH in a slot, the SCI being associated with a control message and the PSSCH being associated with a data message, and the SCI including an indication that the SCI and the PSSCH are decoupled in the slot, e.g., as described in connection with 1202 of FIG. 12. The communication manager 1332 further includes an SCI and data decode component 1342 that is configured to decode the data message based at least in part on the indication, e.g., as described in connection with 1204 of FIG. 12.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband processor 1304, includes means for receiving, from a first UE, SCI and a PSSCH in a slot, the SCI being associated with a control message and the PSSCH being associated with a data message, and the SCI including an indication that the SCI and the PSSCH are decoupled in the slot (e.g., the decoupled indication process component 1340 and/or the reception component 1330). The apparatus 1302 includes means for decoding the data message based at least in part on the indication (e.g., the SCI and data decode component 1342 and/or the reception component 1330).

In one configuration, the control message may be an SCI-only message, and the data message may be a data-only message.

In another configuration, the control message may include at least one of: a pre-emption indication, a transmit power control for the PSSCH and a PSCCH, a transmit power control for an SRS associated with sidelink positioning or an SRS request, a sidelink cancellation indication, or a notification of power saving information outside a DRX active time for one or more UEs.

In another configuration, the indication may be based at least in part on CRC scrambling associated with the control message, based at least in part on an SCI format associated with the control message, and/or based at least in part on one or more bits in the SCI indicating that the SCI and the PSSCH are decoupled in the slot.

In another configuration, the SCI may be a first part SCI (SCI 1) or a second part SCI (SCI 2), the SCI 1 may be received on a PSCCH and the SCI 2 may be received on the PSSCH. In such a configuration, the indication may be received via the SCI 1 or the SCI 2 if the SCI and the PSSCH are transmitted by the first UE based at least in part on a sidelink transmission mode 1. In such a configuration, the indication may be received via the SCI 2 if the SCI and the PSSCH are transmitted by the first UE based at least in part on a sidelink transmission mode 2.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to multiplex SCI with a PSSCH in a slot, the SCI being associated with a control message and the PSSCH being associated with a data message, and the SCI including an indication that the SCI and the PSSCH are decoupled in the slot; and transmit, to a second UE, the SCI and the PSSCH in the slot.

Aspect 2 is the apparatus of aspect 1, where the control message is an SCI-only message, and where the data message is a data-only message.

Aspect 3 is the apparatus of any of aspects 1 and 2, where the control message includes at least one of: a pre-emption indication; a transmit power control for the PSSCH and a PSCCH; a transmit power control for an SRS associated with sidelink positioning or an SRS request; a sidelink cancellation indication; or a notification of power saving information outside a DRX active time for one or more UEs.

Aspect 4 is the apparatus of any of aspects 1 to 3, where the indication is based at least in part on CRC scrambling associated with the control message.

Aspect 5 is the apparatus of any of aspects 1 to 4, where the indication is based at least in part on an SCI format associated with the control message.

Aspect 6 is the apparatus of any of aspects 1 to 5, where the indication is based at least in part on one or more bits in the SCI indicating that the SCI and the PSSCH are decoupled in the slot.

Aspect 7 is the apparatus of any of aspects 1 to 6, where the SCI is a first part SCI (SCI 1) or a second part SCI (SCI 2), the SCI 1 being transmitted on a PSCCH and the SCI 2 being transmitted on the PSSCH.

Aspect 8 is the apparatus of any of aspects 1 to 7, where the indication is transmitted via the SCI 1 or the SCI 2 if the SCI and the PSSCH are transmitted to the second UE based at least in part on a sidelink transmission mode 1.

Aspect 9 is the apparatus of any of aspects 1 to 8, where the indication is transmitted via the SCI 2 if the SCI and the PSSCH are transmitted to the second UE based at least in part on a sidelink transmission mode 2.

Aspect 10 is the apparatus of any of aspects 1 to 9, further includes a transceiver coupled to the at least one processor.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including at least one processor coupled to a memory and configured to receive, from a first UE, SCI and a PSSCH in a slot, the SCI being associated with a control message and the PSSCH being associated with a data message, and the SCI including an indication that the SCI and the PSSCH are decoupled in the slot; and decode the data message based at least in part on the indication.

Aspect 15 is the apparatus of aspect 14, where the control message is an SCI-only message, and where the data message is a data-only message.

Aspect 16 is the apparatus of any of aspects 14 and 15, where the control message includes at least one of: a pre-emption indication; a transmit power control for the PSSCH and a PSCCH; a transmit power control for an SRS associated with sidelink positioning or an SRS request; a sidelink cancellation indication; or a notification of power saving information outside a DRX active time for one or more UEs.

Aspect 17 is the apparatus of any of aspects 14 to 16, where the indication is based at least in part on CRC scrambling associated with the control message.

Aspect 18 is the apparatus of any of aspects 14 to 17, where the indication is based at least in part on an SCI format associated with the control message.

Aspect 19 is the apparatus of any of aspects 14 to 18, where the indication is based at least in part on one or more bits in the SCI indicating that the SCI and the PSSCH are decoupled in the slot.

Aspect 20 is the apparatus of any of aspects 14 to 19, where the SCI is a first part SCI (SCI 1) or a second part SCI (SCI 2), the SCI 1 being received on a PSCCH and the SCI 2 being received on the PSSCH.

Aspect 21 is the apparatus of any of aspects 14 to 20, where the indication is received via the SCI 1 or the SCI 2 if the SCI and the PSSCH are transmitted by the first UE based at least in part on a sidelink transmission mode 1.

Aspect 22 is the apparatus of any of aspects 14 to 21, where the indication is received via the SCI 2 if the SCI and the PSSCH are transmitted by the first UE based at least in part on a sidelink transmission mode 2.

Aspect 23 is a method of wireless communication for implementing any of aspects 14 to 22.

Aspect 24 is an apparatus for wireless communication including means for implementing any of aspects 14 to 22.

Aspect 25 is a computer-readable medium storing computer executable code, where the code when executed by a processor causes the processor to implement any of aspects 14 to 22.

What is claimed is:

1. An apparatus for wireless communication at a first user equipment (UE), comprising:
   at least one memory; and
   at least one processor coupled to the at least one memory and configured to:
      identify a slot is scheduled by first sidelink control information (SCI) for transmitting a data-only message in a physical sidelink shared channel (PSSCH) of the slot, wherein the data-only message is scheduled by the first SCI from another slot prior to the slot based on a semi-persistent scheduling (SPS);
      multiplex second SCI with the PSSCH in the slot that carries the data-only message scheduled based on the SPS, the second SCI being an SCI-only message that does not reserve resources for the PSSCH in the slot, and the second SCI including an indication that the second SCI and the PSSCH are decoupled in the slot in which the second SCI does not reserve the resources for the PSSCH in the slot, wherein the first SCI and the second SCI are on different slots; and
      transmit, to a second UE, the second SCI including the indication and the PSSCH in the slot.

2. The apparatus of claim 1, wherein the SCI-only message comprises at least one of:
   a first transmit power control for the PSSCH and a physical sidelink control channel (PSCCH);
   a second transmit power control for a sounding reference signal (SRS) associated with sidelink positioning or an SRS request;
   a sidelink cancellation indication; or
   a notification of power saving information outside a discontinuous reception (DRX) active time for one or more UEs.

3. The apparatus of claim 1, wherein the indication is based at least in part on cyclic redundancy check (CRC) scrambling associated with the SCI-only message.

4. The apparatus of claim 1, wherein the indication is based at least in part on an SCI format associated with the SCI-only message.

5. The apparatus of claim 1, wherein the indication is based at least in part on one or more bits in the second SCI indicating that the second SCI and the PSSCH are decoupled in the slot.

6. The apparatus of claim 1, wherein the second SCI is a first part SCI (SCI 1) or a second part SCI (SCI 2), the SCI 1 being transmitted on a physical sidelink control channel (PSCCH) and the SCI 2 being transmitted on the PSSCH.

7. The apparatus of claim 6, wherein a transmission of the indication is via the SCI 1 or the SCI 2 if the transmission of the second SCI and the PSSCH to the second UE is based at least in part on a sidelink transmission mode 1.

8. The apparatus of claim 6, wherein a transmission of the indication is via the SCI 2 if the transmission of the second SCI and the PSSCH to the second UE is based at least in part on a sidelink transmission mode 2.

9. The apparatus of claim 1, further comprising a transceiver coupled to the at least one processor.

10. A method of wireless communication at a first user equipment (UE), comprising:
    identifying a slot is scheduled by first sidelink control information (SCI) for transmitting a data-only message in a physical sidelink shared channel (PSSCH) of the slot, wherein the data-only message is scheduled by the first SCI from another slot prior to the slot based on a semi-persistent scheduling (SPS);
    multiplexing second SCI with the PSSCH in the slot that carries the data-only message scheduled based on the SPS, the second SCI being an SCI-only message that does not reserve resources for the PSSCH in the slot, and the second SCI including an indication that the second SCI and the PSSCH are decoupled in the slot in which the second SCI does not reserve the resources for the PSSCH in the slot, wherein the first SCI and the second SCI are on different slots; and
    transmitting, to a second UE, the second SCI including the indication and the PSSCH in the slot.

11. The method of claim 10, wherein the SCI-only message comprises at least one of:
    a first transmit power control for the PSSCH and a physical sidelink control channel (PSCCH);
    a second transmit power control for a sounding reference signal (SRS) associated with sidelink positioning or an SRS request;
    a sidelink cancellation indication; or
    a notification of power saving information outside a discontinuous reception (DRX) active time for one or more UEs.

12. The method of claim 10, wherein the indication is based at least in part on cyclic redundancy check (CRC) scrambling associated with the SCI-only message.

13. The method of claim 10, wherein the indication is based at least in part on an SCI format associated with the SCI-only message.

14. The method of claim 10, wherein the indication is based at least in part on one or more bits in the second SCI indicating that the second SCI and the PSSCH are decoupled in the slot.

15. The method of claim 10, wherein the second SCI is a first part SCI (SCI 1) or a second part SCI (SCI 2), the SCI 1 being transmitted on a physical sidelink control channel (PSCCH) and the SCI 2 being transmitted on the PSSCH.

16. The method of claim 15, wherein the indication is transmitted via the SCI 1 or the SCI 2 if the second SCI and the PSSCH are transmitted to the second UE based at least in part on a sidelink transmission mode 1.

17. The method of claim 15, wherein the indication is transmitted via the SCI 2 if the second SCI and the PSSCH are transmitted to the second UE based at least in part on a sidelink transmission mode 2.

18. An apparatus for wireless communication at a second user equipment (UE), comprising:
- at least one memory; and
- at least one processor coupled to the at least one memory and configured to:
  - receive, from a first UE, second sidelink control information (SCI) and a physical sidelink shared channel (PSSCH) in a slot, the second SCI being an SCI-only message that does not reserve resources for the PSSCH in the slot and the PSSCH being associated with a data-only message that is scheduled by first SCI from another slot prior to the slot based on a semi-persistent scheduling (SPS), wherein the first SCI and the second SCI are on different slots, wherein the second SCI is multiplexed with the PSSCH in the slot that carries the data-only message scheduled based on the SPS, and wherein the second SCI including an indication that the second SCI and the PSSCH are decoupled in the slot in which the second SCI does not reserve the resources for the PSSCH in the slot; and
  - decode the data-only message based at least in part on the indication.

19. The apparatus of claim 18, wherein the SCI-only message comprises at least one of:
- a first transmit power control for the PSSCH and a physical sidelink control channel (PSCCH);
- a second transmit power control for a sounding reference signal (SRS) associated with sidelink positioning or an SRS request;
- a sidelink cancellation indication; or
- a notification of power saving information outside a discontinuous reception (DRX) active time for one or more UEs.

20. The apparatus of claim 18, wherein the indication is based at least in part on cyclic redundancy check (CRC) scrambling associated with the SCI-only message.

21. The apparatus of claim 18, wherein the indication is based at least in part on an SCI format associated with the SCI-only message.

22. The apparatus of claim 18, wherein the indication is based at least in part on one or more bits in the second SCI indicating that the second SCI and the PSSCH are decoupled in the slot.

23. The apparatus of claim 18, wherein the second SCI is a first part SCI (SCI 1) or a second part SCI (SCI 2), the SCI 1 being received on a physical sidelink control channel (PSCCH) and the SCI 2 being received on the PSSCH.

24. The apparatus of claim 23, wherein a reception of the indication is via the SCI 1 or the SCI 2 if the reception of the second SCI and the PSSCH from the first UE is based at least in part on a sidelink transmission mode 1.

25. The apparatus of claim 23, wherein a reception of the indication is via the SCI 2 if the reception of the second SCI and the PSSCH from the first UE is based at least in part on a sidelink transmission mode 2.

26. The apparatus of claim 18, further comprising a transceiver coupled to the at least one processor.

27. A method of wireless communication at a second user equipment (UE), comprising:
- receiving, from a first UE, second sidelink control information (SCI) and a physical sidelink shared channel (PSSCH) in a slot, the second SCI being an SCI-only message that does not reserve resources for the PSSCH in the slot and the PSSCH being associated with a data-only message that is scheduled by first SCI from another slot prior to the slot based on a semi-persistent scheduling (SPS), wherein the first SCI and the second SCI are on different slots, wherein the second SCI is multiplexed with the PSSCH in the slot that carries the data-only message scheduled based on the SPS, and wherein the second SCI including an indication that the second SCI and the PSSCH are decoupled in the slot in which the second SCI does not reserve the resources for the PSSCH in the slot; and
- decoding the data-only message based at least in part on the indication.

* * * * *